United States Patent Office 3,223,622
Patented Dec. 14, 1965

3,223,622
DRILLING MUD SYSTEM
James L. Lummus, Platho P. Scott, Jr., and Arthur Park, Tulsa, Okla., assignors to Pan American Petroleum Corporation, Tulsa, Okla., a corporation of Delaware
No Drawing. Filed June 25, 1962, Ser. No. 205,130
4 Claims. (Cl. 252—8.5)

The present invention is concerned with a method for freeing drill pipe from a well. More particularly, it is concerned with an improved procedure for freeing drill pipe stuck against the well face by means of the differential pressure between the drilling mud cake and the formation.

Briefly, we solve this problem by either spotting a mud containing a suitable surface-active agent opposite the stuck pipe or we add the surfactant to the mud while drilling through sections where differential sticking is expected. The agents we have found to be operable for this purpose consist of a relatively small class of sulfur containing materials in which the sulfur is in the form of either a sulfate or a sulfonate. In establishing such materials as effective agents for freeing stuck pipe, some 1200 compounds were tested.

Frequently, in drilling operations, particularly at depths in excess of 10,000 to 12,000 feet, the drill pipe becomes stuck and cannot be rotated or removed from the hole. In any hole where the mud pressure is substantially higher than the formation fluid pressure, a mud cake forms opposite the permeable section of the hole and a flow of filtrate passes through the mud cake and into the formation, thus thickening the mud. It has been previously observed that a pressure differential from the well bore to a permeable formation covered with mud cake can hold the pipe next to the well bore wall with great force. This occurs when a portion of the pipe rests against the wall of the well, imbedding itself in the filter cake. The area of the drill pipe in contact with the cake is thus sealed off from the full hydrostatic pressure of the mud column. The pressure difference between the mud column pressure and the formation pressure acts on the area of drill pipe in contact with the mud cake to hold the pipe against the wall of the hole. The degree to which this phenomenon occurs depends on a number of factors, such as mud weight, the permeability of the formation, the area of contact of the pipe with the mud cake, fluid loss properties of the mud, the time that the pipe remains in contact with the thickened filter cake, etc.

It has previously been suggested that surface-active agents be employed in drilling muds to solve the problem of differential sticking. In our investigation, however, we found that the kind of surface-active material capable of solving this problem is very limited. The fact that a certain composition possesses excellent surface-active properties is not necessarily any criterion that it will function satisfactorily in the freeing of differentially stuck drill pipe. For example, a good additive for our purposes should (1) be highly compatible with bentonite and other components of drlling muds, (2) show good stability at temperatures up to about 350° F., (3) be resistant to solids contamination, and (4) reduce gel strength and viscosity.

These additives may be employed in amounts ranging from about .2 to about 25 pounds per barrel of mud, preferably from about 2 to about 10 pounds per barrel. The additive may be used in concentrations greater than those stated; however, no appreciable benefit is generally produced by the presence of these increased amounts.

Frequently, in drilling operations of the kind contemplated herein, gas is encountered and, if present in substantial quantities, results in a marked reduction of mud density. The presence of such gas can be very troublesome and difficult to cope with owing to the gas bubbles formed by agitation of the mud column with the rising gas. This means that if such conditions persist, a substantial length of the mud column will be of low density, thereby increasing the danger of a blow-out. To avoid this difficulty, we add to the surface-active agent a foam inhibitor or foam depressant. While there are a large number of materials that serve as defoamers, many of them are unsatisfactory because they flocculate the clay in the drilling fluid. Materials we have found to be suitable for this purpose are an oil-soluble nonyl phenoxy polyethylene ethanol, 2,4,7,9-tetramethyldec-5-yne-4,7-diol and an addition product of ethylene glycol and ethylene oxide containing from 10 to 20 percent of ethylene oxide in the molecule. The defoamers are preferably used in a minor amount with the surface-active agents in our invention, typically three parts of surface-active agent to two parts of the defoamer. These materials, of course, may be used in other proportions; however, for any given circumstance the amount of defoamer required can be readily determined by checking the mud density after addition of the antifoaming agent to the mud system.

As previously mentioned, the surfactant employed must be compatible with the other mud components. Accordingly, in screening some 1200 compounds to determine which materials were suitable for our purpose, a flocculation test was first carried out as follows: To a beaker containing 100 ml. of drilling mud was added 1 ml. of the surfactant. The resulting mixture was stirred with a spatula and if an apparent thickening of the mud occurred, this was an indication that the surfactant flocculated the clay particles in the mud and, therefore, could not be used. This procedure resulted in the elimination of some 1000 compounds. The remaining 200 surfactants were then subjected to a low pressure differential sticking testing device, such as that described in "Drilling and Production Practice," page 55, by W. E. Helmick and A. J. Longley, presented by A. J. Longley at the spring meeting of the Pacific Coast District, Division of Production, Los Angeles, California, May 1957: This series of tests indicated that 8 of the aforesaid 200 agents might possibly function satisfactorily to free differentially stuck drill pipe. However, before this could be determined to our satisfaction, the materials passing the previous test were subjected to conditions which in all material respects duplicated conditions encountered in a well causing differentially stuck pipe.

Actually, we found no cationic and only a few nonionic surface-active materials that met the above requirements. As previously indicated, a few anionic surfactants qualified. The principal operative materials are characterized by the presence of either a sulfate or sulfonate grouping. Examples of compositions included in this group are lauryl alcohol sulfate, magnesium lauryl alcohol sulfate, and a complex amine sulfonate prepared from about 4 parts of a half ammonium half isopropylamine salt of the sulfosuccinic acid ester of the oleic acid amide of isopropanol amine and about 1 part of the isopropylamine salt of dodecyl benzene sulfonic acid. Further particulars on the preparation of this latter compound are disclosed in U.S. 2,976,209. For convenience this compound is hereinafter referred to as "complex amine sulfonate." Examples of nonionic materials capable of preventing differential sticking are addition products of propylene oxide and ethylene diamine having a molecular weight ranging from about 500 to about 3600 reacted with sufficient ethylene oxide to constitute from about 10 to about 90 weight percent of the final product, and the ethylene oxide adduct of polypropylene glycol. The latter compound is one in which 20 to 80 percent of the molecule is composed of ethylene oxide groups and the polypropylene glycol component has a molecular weight ranging from about 1500 to about 2500. There also may be mentioned the long chain hydrocarbon alkali metal sulfonates, e.g., the sodium salt of dodecyl sulfonic acid, the alkali metal or ammonium salts of the sulfate ester of an alkylphenoxy polyoxyethylene ethanol, a nonyl phenoxy polyoxyethylene ethanol in which from about 70 to about 90 weight percent of the compound is ethylene oxide, 1,4-dimethyl-1,4-diisobutenyl butyne-1,4-diol, the reaction product of cocoanut fatty acid amine and about 20 mols of ethylene oxide, the reaction product of the aliphatic alcohol fraction derived from lanolin and from about 15 to about 75 mols of ethylene oxide, the adduct of abietylamine and from about 20 to 45 mols of ethylene oxide, the alkali metal salt of dodecylbenzene sulfonic acid, sodium lauryl sulfate and oleyl alcohol sulfate.

In interpreting the scope of the claims, it is to be understood that the term "alkali metal" is intended to include the ammonium ion or radical.

In testing the performance of these surface-active agents under drilling conditions, a differential pressure of 500 p.s.i. was applied for 5 minutes across the interface between the mud and the formation. The drill pipe was next forced against the resulting mud cake for a period of 10 minutes. Thereafter, the amount of force (in pounds) required to free the stuck pipe was measured.

The problem of dealing with the phenomenon of differential sticking can be approached from either of two ways. If the drill pipe is stuck, a batch of heavy mud, for example 16 pounds per gallon, containing 3 to 10 pounds per barrel of surface-active agent, may be run down the drill pipe and back up the annulus to a level slightly above the highest point in the hole where sticking occurs. Force is then applied to the pipe by attempting to rotate it or work it free. Usually within 18 to 36 hours the pipe is free.

These additives may also be used in the mud as a preventative for differential sticking, in which case the agent is incorporated in the mud system during circulation in a concentration of from about 2 to about 10 pounds per barrel. This concentration of agent should be maintained in the mud system. The addition of more agent to the mud should be made when the fluid loss exceeds the original value by about 2 to 3 cc. for 30 minutes, as determined by the standard API test. Gradual additions of the surfactant are made until the fluid loss value is reduced to the desired level.

While oil base muds have been employed with success in overcoming the problem of differential sticking, it should be pointed out that the quantity of such materials required to solve the problem is much greater than is necessary in the case of surfactants of our invention. Thus, where an oil base mud is used to free differentially stuck pipe, it must be spotted in the well in an amount sufficient to extend from the bottom to a level slightly above the location where the sticking occurs. In other words, nothing but oil base mud is used in the well up to a level at least as high as the uppermost point of differential sticking. On the other hand, merely by adding a surface-active agent of the class claimed herein to the mud system in use, we can readily free drill pipe stuck by differential pressure. The surfactant in such cases need only be added in amounts of 5 to 10 pounds per barrel of mud. Moreover, the amount of mud so treated corresponds to the quantity required to extend from the bottom of the well to a level slightly above the point where sticking occurs. By the use of a fluid containing such surfactant instead of employing an oil base mud, the cost is reduced to about one fourth of that necessary when using oil base muds.

The effectiveness of the class of surfactants disclosed herein in freeing differentially stuck drill pipe is shown in the table below. A comparison is also made with other surface-active agents under identical conditions. In these tests, a gyp-Q Broxin mud was employed, weighing 16 pounds per gallon. Q-Broxin is a commercially available mud thinner consisting essentially of iron and chrome lignin salts. This material was added to a typical mud containing bentonite, native clay, diesel oil, a weighting agent, such as barium sulfate, and about 5 pounds per barrel of nonyl phenoxy polyethylene ethanol. The tests were performed by running the treated mud down the drill pipe and spotting such mud at a level slightly above the uppermost point at which sticking occurred.

*Table I*

| Additive | Amount of Additive Used, lbs./bbl. | Pullout force, in pounds |
|---|---|---|
| Untreated Mud | | 600 |
| Complex Amine Sulfonate | 5 | 80 |
| Lauryl Alcohol Sulfate | 5 | 120 |
| Magnesium Lauryl Alcohol Sulfate | 5 | 172 |
| 3 parts Complex Amine Sulfonate plus 2 parts Oil-Soluble Nonyl Phenoxy Polyoxy Ethylene Ethanol | 5 | 120 |
| Oil Base Mud | ¹ 18 | 80 |

¹ Pounds per gallon.

The surface-active agents that lowered the freeing or pullout force were all of the anionic type. Nonionic surface-active agents were in the untreated mud in a concentration of 5 pounds per barrel and had no observable benefit. It will also be noted that oil base mud reduced the pullout force as much as some of the better agents of our invention. However, as mentioned previously, it must be remembered that with our agents we need only to use a few pounds per barrel of mud to secure improved results, whereas with oil base muds the system must be converted completely to that kind of material.

In another series of tests a number of surfactants were added to a typical field gyp-Q Broxin mud weighing 16 pounds per gallon. In this case the surfactant was added to the entire mud system as a measure to prevent differential sticking of the drill pipe. Below the dividing line (————) another 16 pound mud, similar in type to the gyp-Q Broxin mud, was tested with various additives to determine their ability to prevent differential sticking. In both series of tests, the additives were used in a concentration of 5 lbs./bbl. The results obtained are shown in Table II.

Table II

| Additive | Type of Surfactant | Differential Sticking Force, lbs. | Percent Reduction in Sticking Force |
|---|---|---|---|
| ------------------- | ------------- | 600 | None |
| Complex Amine Sulfonate | Anionic | 0 | 100 |
| Nonyl Phenoxy Polyoxyethylene Ethanol | Nonionic | 605 | None |
| Ethylene Oxide Adduct of Polypropylene Glycol.[1] | ---do--- | 186 | 70 |
| Sequential Addition Product of Propylene Oxide and Ethylene Oxide to Ethylene Diamine.[2] (------) | ---do--- | 190 | 70 |
| ------------------- | Anionic | 320 | None |
| Complex Amine Sulfonate | Anionic | 110 | 66 |
| Ammonium Salt of Sulfate Ester of Alkylphenoxy-Ethylene Ethanol | Anionic | 160 | 50 |
| Sodium Salt of Alkyl Arylpolyether Sulfate | Anionic | 290 | 10 |
| Iso Octyl Phenyl Poly Ethoxy Ethanol | Nonionic | 260 | 19 |
| Oleyl Alcohol Sulfate | Anionic | 180 | 44 |
| Sodium Tallow Sulfate | ---do--- | 270 | 16 |
| Sodium Alkyl Aryl Sulfonate | ---do--- | ([3]) | ----- |
| Sodium Lauryl Sulfate | ---do--- | 220 | 31 |
| Magnesium Lauryl Sulfate | ---do--- | 160 | 50 |
| Tetra Sodium Salt of Diamine Tetraacetic Acid | ---do--- | 320 | 0 |

[1] The polypropylene glycol had a molecular weight of from 1500 to 1800.
[2] Product of propylene oxide and ethylene diamine having a molecular weight of from 2,500 to about 3,000 reacted with sufficient ethylene oxide to constitute from about 10 to about 20 weight percent of the final compound.
[3] Flocculates Mud.

From the above table it will be seen that the property of a surface-active agent to prevent or alleviate differential sticking is a highly empirical one. Thus, while the majority of the materials that possess this property are either sulfates or sulfonates, some of such compounds are completely ineffective. Also, it will be noted that although the majority of operable materials are anionic surfactants, two of the better ones are nonionics. In addition, it is seen that the ability of these different additives to combat differential sticking problems depends to some extent on the mud used.

To further demonstrate the empirical nature of our invention, we would like to mention, by way of example, a number of surface-active agents—anionic, cationic and nonionic—that flocculate mud and, hence, are of no value whatever for our purpose; diethyl ester of sodium sulfosuccinic acid, polyoxy ethylene sorbitol oleate laurate, modified alkyl phosphate ester, dicoco dimethyl ammonium chloride, polyoxy ethylene lauryl ether, dinonyl phenol and 14 mols ethylene oxide, amine salt of dodecyl benzene sulfonic acid, the water-soluble forms of nonyl phenol polyoxy ethylene ethanols, higher alkyl polyoxy ethylene ethanol.

Oftentimes, it is desirable to add an oil such as, for example, diesel oil to a drilling mud to improve fluid loss properties as well as to protect water-sensitive formations from exposure to an aqueous phase. As the hole is drilled to greater depths, however, the formation temperature increases to the point where diesel oil is difficult to maintain in the mud. In a circumstance of this sort, an asphalt emulsion is usually substituted for the lower-boiling oil. While a mud containing asphalt tends to protect formations from water damage and maintain the fluid loss properties within an operable range, the viscosity and gel strength of the mud increase and it is difficult to distribute the asphalt uniformly through the mud system. This requires the addition of mud thinners in order to disperse the asphalt emulsion properly. Such treatment is usually time-consuming and, as a result, operators are inclined to avoid the use of these emulsions even though they are definitely helpful in improving mud characteristics at high temperatures.

We have found, however, that we can readily disperse such emulsions into heavy muds without harmful effects on the viscosity or gel strength. Thus, in one instance, 1000 barrels of asphalt emulsion were aded and dispersed into a 16 pounds per gallon gyp-Q Broxin mud in a period of about six hours with the aid of a surfactant of the class described and claimed herein. Without the use of such surfactant a period of several days was necessary to add the same amount of asphalt emulsion to the mud system in a well being drilled in the same area. In carrying out such treatment, the surfactant may be added either to the mud or to the emulsion. If added to the mud, the surfactant should be incorporated therein in a concentration ranging from about .5 to about 10 pounds per barrel and preferably from about 1 to about 6 pounds per barrel. If added to the emulsion, the surface-active agent should be used generally in an amount corresponding to about 5 pounds per barrel. Such concentration of surface-active agent in the asphalt emulsion usually is adequate where it is desired to employ a mud with an asphalt content of as much as 10 percent. Smaller amounts of surfactants in the emulsion may, of course, be used if the surface-active agent is already in the mud or where the amount of asphalt present in the mud system is below about 6 percent.

The effectiveness of agents of the type contemplated herein to facilitate the adidtion of asphalt to a mud system is clearly demonstrated by the data in the table below. It will be seen that agents of the aforesaid type not only aid in the incorporation of asphaltic materials in the mud, but very substantially improve such important characteristics thereof as fluid loss, gel strength, and viscosity. In this work, a 16 pounds per gallon gyp-Q Broxin mud having a pH of 11.5 was employed. The above properties were demonstrated by first measuring the gel strength, viscosity and fluid loss of the untreated mud. Thereafter, an asphalt emulsion was added in the amount indicated below and the aforesaid properties were again measured. Finally, to equal portions of the asphalt-treated mud were added different surface-active agents we have found suitable for prevention of differential sticking. The results exhibiting fluid loss improvements are shown below. In all cases, the surface-active agents were added in a concentration of 5 pounds per barrel.

Table III

| Additive | Apparent Viscosity, cps. | Plastic Viscosity, cps. | Yield Value, lbs./100 sq. ft. | Gel Strength 10 sec., lbs./100 sq. ft. | Gel Strength 10 min., lbs./100 sq. ft. | API Fluid Loss, cc. |
|---|---|---|---|---|---|---|
| ----- | 71 | 60 | 22 | 8 | 44 | 3 |
| Asphalt Emulsion 10½ by Volume | 92 | 69 | 56 | 22 | 154 | 2.8 |
| Complex Amine Sulfonate plus 3-⅓ lbs./bbl. of oil-soluble nonyl phenoxy polyethylene ethanol/bbl | 60 | 45 | 29 | 8 | 23 | .3 |
| Reaction product of abietylamine and 20 mols of ethylene oxide | ----- | ----- | ----- | ----- | ----- | .65 |
| Reaction product of abietylamine and 45 mols of ethylene oxide | ----- | ----- | ----- | ----- | ----- | .85 |
| Cocoanut fatty acid amine plus 20 mols of ethylene oxide | ----- | ----- | ----- | ----- | ----- | 1.0 |
| Adducts of 15 mols of ethylene oxide and aliphatic alcohol fraction from lanolin | ----- | ----- | ----- | ----- | ----- | .1 |
| Adducts of 75 mols of ethylene oxide and aliphatic alcohol fraction from lanolin | ----- | ----- | ----- | ----- | ----- | .5 |
| Sodium dodecyl benzene sulfonate | ----- | ----- | ----- | ----- | ----- | .5 |

Another embodiment of our invention is concerned with the use of a combination of these surface-active agents with a liquid hydrocarbon in unweighted muds, i.e., muds having a density of from about 8.5 to about 12 lbs./gal. to improve the fluid loss characteristics of such muds. Drilling fluids coming within this class are clear water drilling fluids, low solids drilling fluids and salt water muds, to name a few. In some instances we have found the combination of hydrocarbon and surface-active agent reduces the fluid loss of these unweighted muds as much as about 10 to 15 times that of the untreated muds.

While the greatest improvement in fluid loss characteristics is generally obtained by the use of a combination of these surface-active agents and the class of hydrocarbons taught herein, it will be noted from the data disclosed that such surface-active agents themselves exhibit, in many instances, a marked reduction in fluid loss properties of either the weighted or unweighted muds. Accordingly, our invention contemplates the use of either surface-active agents by themselves or in combination with said hydrocarbons to secure an improvement in fluid loss property of said muds.

When reducing the fluid loss of the unweighted muds, mentioned above, it is frequently desirable to incorporate a defoaming agent for reasons similar to those outlined in connection with the heavier drilling fluids. The same, or similar, defoaming agents can be used and in about the same concentrations as have been taught in the case of the heavy drilling fluids. In the event foaming of the surface-active agent under conditions of use becomes excessive or objectionable, the concentration of such agent can be reduced oftentimes to overcome this problem.

To demonstrate the favorable influence of our invention on the fluid loss characteristics of some typical unweighted muds, the data appearing in the tables below are included. In these runs, three different kinds of unweighted muds were used. Thus, the mud shown in Table IV was a low solids mud having 3 percent bentonite and 3 percent native clay. The mud in Table V was a natural field mud, while the one in Table VI was a salt clay mud having a density of 10–11 pounds per gallon.

*Table IV*

| Oil or Asphalt Additive | Conc. percent/vol. | Surfactants | Type | Conc. Lb./Bbl. | Apparent Vis., cps. | Plastic Vis., cps. | Yield Value, Lb./100 sq. ft. | 10 Sec. Gel Strength, Lb./100 sq. ft. | 10 Min. Gel. Strength, Lb./100 sq. ft. | Fluid Loss API, ML/30 Min. |
|---|---|---|---|---|---|---|---|---|---|---|
| | | | | | 5 | 4 | 2 | 2 | 8 | 12.4 |
| Diesel | 6 | | | | 6 | 6 | 0 | 2 | 2 | 10.0 |
| Asphalt | 6 | | | | 10 | 8 | 4 | 0 | 7 | 9.2 |
| | | 3 parts complex amine sulfonate plus 2 parts of oil soluble nonyl phenoxy polyoxyethylene ethanol. | Anionic | 3 | 7 | 5 | 5 | 2 | 10 | 9.9 |
| | | ...do... | ...do... | 5 | 9 | 8 | 2 | 2 | 11 | 8.5 |
| Diesel | 6 | ...do... | ...do... | 3 | 8 | 6 | 5 | 2 | 11 | 8.2 |
| Do | 6 | ...do... | ...do... | 5 | 9 | 7 | 5 | 2 | 12 | 6.6 |
| Asphalt | 6 | ...do... | ...do... | 5 | 9 | 7 | 4 | 1 | 14 | 6.8 |
| Diesel | 6 | Ethylene diamine reacted with sufficient propylene oxide to give a product having a mol. wt. of between 2,500 and 3,000, in turn reacted with enough ethylene oxide to constitute 10 to 20 wt. percent of the final product. | Nonionic | 5 | 7 | 6 | 2 | 1 | 6 | 9.3 |
| Do | 6 | Ethylene oxide adduct of polypropylene glycol in which about 80 weight percent of the molecule is composed of ethylene oxide groups and the molecular weight of the polypropylene glycol is between about 1,500 to 1,800. | ...do... | 5 | 6 | 6 | 0 | 2 | 2 | 7.1 |
| Do | 6 | Ethylene oxide adduct of polypropylene glycol in which about 30 weight percent of the molecule is composed of ethylene oxide groups and the molecular weight of the polypropylene glycol is between about 1,500 to 1,800. | ...do... | 5 | 5 | 4 | 2 | 1 | 1 | 10.0 |
| Do | 6 | Complex amine sulfonate | Anionic | 5 | 8 | 6 | 5 | 2 | 11 | 6.2 |
| Do | 6 | Ethylene oxide adduct of polypropylene glycol in which about 80 weight percent of the molecule is composed of ethylene oxide groups and the molecular weight of the polypropylene glycol is between about 2,100 and about 2,500. | Nonionic | 5 | 6 | 6 | 0 | 2 | 2 | 6.2 |
| Asphalt | 6 | ...do... | ...do... | 5 | 13 | 12 | 3 | 0 | 2 | 5.4 |
| Do | 6 | Ethylene diamine reacted with sufficient propylene oxide to give a product having a mol. wt. of between 3,000 and 3,600 in turn reacted with enough ethylene, oxide to constitute 10 to 20 wt. percent of the final product. | ...do... | 5 | 17 | 13 | 9 | 7 | 13 | 7.9 |
| Do | 6 | Ethylene diamine reacted with sufficient propylene oxide to give a product having a mol. wt. of between 500 and 1,000 in turn reacted with enough ethylene oxide to constitute 40 to 50 wt. percent of the final product. | ...do... | 5 | 9 | 8 | 3 | 0 | 14 | 11.3 |
| | | A long chain hydrocarbon* sodium sulfonate. | Anionic | 5 | 15 | 11 | 8 | 7 | 12 | 11.5 |
| Asphalt | 6 | ...do... | ...do... | 5 | 13 | 10 | 7 | 8 | 15 | 8.8 |
| | | Magnesium lauryl sulfonate | ...do... | 5 | | | | | | 11.0 |
| Asphalt | 6 | ...do... | ...do... | 5 | | | | | | 7.3 |
| Do | 6 | 1,4-dimethyl-1,4-diisobutenyl butyne-1,4-diol. | Nonionic | 5 | 21 | 12 | 18 | 21 | 35 | 5.7 |
| Do | 6 | 3 parts complex amine sulfonate plus 2 parts of oil soluble nonyl phenoxy polyoxyethylene ethanol. | Anionic | 3 | 16 | 10 | 12 | 6 | 7 | 4.4 |

*Obtained by treating lube oil stock with $H_2SO_4$. This material has a molecular weight of about 745.

Table V

| Oil or Asphalt Additive | Conc. percent/vol. | Surfactants | Type | Conc. Lb./Bbl. | Apparent Vis., cps. | Plastic Vis., cps. | Yield Value, Lb./100 sq. ft. | 10 Sec. Gel Strength, Lb./100 sq. ft. | 10 Min. Gel Strength, Lb./100 sq. ft. | Fluid Loss API, ML/30 Min. |
|---|---|---|---|---|---|---|---|---|---|---|
| | | 3 parts complex amine sulfonate plus 2 parts of oil soluble nonyl phenoxy polyethylene ethanol. | Anionic | 5 | 7.5 | 5 | 5 | 3 | 10 | 75 |
| | | | | | 8 | 5 | 6 | 3 | 5 | 50 |
| Diesel | 6 | do | do | 3 | 11 | 7 | 8 | 5 | 5 | 45 |
| Asphalt | 6 | do | do | 5 | 12 | 9 | 6 | 5 | 6 | 33 |

Table VI

| Oil or Asphalt Additive | Conc. percent/vol. | Surfactants | Type | Conc. Lb./Bbl. | Apparent Vis., cps. | Plastic Vis., cps. | Yield Value, Lb./100 sq. ft. | 10 Sec. Gel Strength, Lb./100 sq. ft. | 10 Min. Gel Strength, Lb./100 sq. ft. | Fluid Loss API, ML/30 Min. |
|---|---|---|---|---|---|---|---|---|---|---|
| | | | | | 13 | 7 | 8 | 20 | 38 | 16 |
| Diesel | 6 | | | | 12 | 7 | 8 | 12 | 35 | 15 |
| Asphalt | 6 | | | | 12 | 8 | 8 | 10 | 23 | 14 |
| | | 3 parts complex amine sulfonate plus 2 parts of oil soluble nonyl phenoxy polyethylene ethanol. | Anionic | 5 | 13 | 8 | 9 | 14 | 38 | 7.5 |
| Diesel | 6 | do | do | 5 | 13 | 7 | 12 | 11 | 34 | 5.5 |
| Do | 6 | Ethylene oxide adduct of polypropylene glycol in which about 80 weight percent of the molecule is composed of ethylene oxide groups and the molecular weight of the polypropylene glycol is between about 2,100 and about 2,500. | Nonionic | 5 | 12 | 9 | 6 | 3 | 14 | 8.0 |
| Asphalt | 6 | do | do | 5 | 12 | 9 | 7 | 5 | 21 | 8.0 |
| Do | 6 | Ethylene diamine reacted with sufficient propylene oxide to give a product having a mol. wt of between 3,000 and 3,600 in turn reacted with enough ethylene oxide to constitute 80 to 90 wt. percent of the final product. | do | 5 | 12 | 10 | 4 | 1 | 15 | 6.3 |
| Do | 6 | Sodium salt of a sulfate ester of an alkyl phenoxy polyoxyethylene ethanol. | Anionic | 5 | 18 | 11 | 17 | 20 | 40 | 10.5 |
| Do | 6 | Nonyl phenoxy polyoxyethylene ethanol in which 80 to 90 wt. percent of the product is ethylene oxide. | Nonionic | 5 | 13 | 11 | 4 | 1 | 16 | 7.8 |
| Do | 6 | Nonyl phenoxy polyoxyethylene ethanol in which 70 to 75 wt. percent of the product is ethylene oxide. | do | 5 | 13 | 10 | 6 | 5 | 21 | 8.6 |
| Do | 6 | Nonyl phenoxy polyoxyethylene ethanol in which 80 to 90 wt. percent of the product is ethylene oxide. | do | 5 | 15 | 11 | 7 | 8 | 27 | 10.1 |
| Do | 6 | 3 parts complex amine sulfonate plus 2 parts of oil soluble nonyl phenoxy polyoxyethylene ethanol. | Anionic | 5 | 15 | 8 | 14 | 15 | 34 | 6.4 |
| Do | 6 | Ethylene diamine reacted with sufficient propylene oxide to give a product having a mol. wt. of between 3,000 and 3,600, in turn reacted with enough ethylene oxide to constitute 80 to 90 wt. percent of the final product. | Nonionic | 5 | 17 | 10 | 4 | 15 | 37 | 5.5 |

A further advantage of the drilling fluids covered by the present invention resides in their behavior while drilling through water-sensitive shale formations. It is well recognized that ordinarily, when drilling in such formations at elevated temperatures, fluid loss characteristics of the mud deteriorate rapidly which, in turn, causes the shale to slough, resulting oftentimes in stuck drill pipe. Fluid loss of Q-Broxin muds tested at 300° F. and 500 p.s.i. frequently amounts to as much as 30 cc. in 30 minutes or even higher. A case history of a specific well in which sloughing of shale was encountered and wherein the drilling fluid of our invention was employed will illustrate the value of said fluid. This well was located in the Lake Raccourci Field, Louisiana, and was completed to a depth of 15,437 feet. The mud was of the same variety as is commonly used in this area, but had added to it three pounds per barrel of complex amine sulfonate plus about 2 pounds per barrel of oil-soluble nonyl phenoxy polyoxyethylene ethanol. At a depth of 15,050 feet the fluid loss was 7.2 cc. in 30 minutes at 300° F. and 500 p.s.i. Without the additive of our invention, the fluid loss of this mud under such conditions was of the order of about 30 cc. in 30 minutes.

Also, we have found that the aforesaid mud with and without the additives of our invention shows widely different fluid loss properties when tested in shale cores. For example, shale cores 4 inches long and 1 inch in diameter were used in fluid loss tests of a plain 16.8 pounds per gallon Q-Broxin mud and of a mud to which had been added 5 pounds per barrel of the aforesaid complex amine sulfonate additive. These tests were carried out at 350° F. and at 500 p.s.i. Three tests were performed with each system. In the case of the untreated mud after one hour the fluid loss was 0.4, 2.0 and 0.7 cc., whereas in all three tests of the treated mud there was no measurable fluid loss.

The expression "heavy mud" or "heavy drilling fluid," as used herein, is intended to mean a drilling fluid which, in addition to water, contains a material such as barite which serves as a weighting agent. Also, these heavy muds contain a viscosity dispersing agent such as chrome or ferro chrome lignin salts plus sufficient caustic to dissolve the lignin salts. These muds generally have a density of at least 12 lbs./gal. and have a pH usually in the range of 8 to 13. These may also contain a weighting agent such as galena to bring the weight of the mud up to a maximum of about 20 to 25 pounds per gallon. To such muds our invention contemplates the addition of from about 2 to about 20 volume percent of a hydrocarbon ranging in type from diesel oil to asphalt. Ordinarily, we prefer to use such hydrocarbon materials in an amount corresponding to from about 5 to 10 volume percent. Muds of the above general composition when combined with the surface-active agents of our invention in the concentrations taught herein result in a drilling fluid possessing excellent anti-differential sticking characteristics. They also exhibit good fluid loss properties.

We claim:

1. In a method for preventing the occurrence of differentially stuck drill pipe wherein a well is being drilled into a formation using a water base liquid drilling fluid and wherein there is a pronounced tendency for said pipe to become stuck to the wall of said well, the improvement which comprises incorporating into said fluid from about 0.2 to about 25 pounds per barrel of said fluid of a surface-active agent prepared from about four parts of a half ammonium half isopropylamine salt of the sulfosuccinic acid ester of the oleic acid amide of isopropanol amine and about one part of the isopropylamine salt of dodecyl benzene sulfonic acid.

2. In a method for preventing the occurrence of differentially stuck drill pipe wherein a well is being drilled into a formation using a liquid drilling fluid and wherein there is a pronounced tendency for said pipe to become stuck to the wall of said well, the improvement which comprises incorporating into said fluid from about 0.2 to about 25 pounds per barrel of said fluid of a surface-active agent prepared from about four parts of a half ammonium half isopropylamine salt of the sulfosuccinic acid ester of the oleic acid amide of isopropanol amine and about one part of the isopropylamine salt of dodecyl benzene sulfonic acid.

3. The method of claim 2 wherein a defoaming agent compatible with said fluid has been added thereto, said defoaming agent being present in a minor amount with respect to said surface-active agent.

4. The method of claim 2 in which said fluid has incorporated therein from about 2 to about 20 volume percent of a liquid hydrocarbon having a boiling point at least as high as that of diesel oil.

References Cited by the Examiner

UNITED STATES PATENTS

| | | | |
|---|---|---|---|
| 2,423,144 | 7/1947 | Gregg | 252—8.5 |
| 2,555,794 | 6/1951 | Henkes | 252—8.5 |
| 2,568,992 | 9/1951 | Doscher | 252—8.5 |
| 2,976,209 | 3/1961 | Lindner | 252—152 |
| 3,034,984 | 5/1962 | Weiss | 252—8.5 |
| 3,047,493 | 7/1962 | Rosenberg | 252—8.5 |
| 3,047,494 | 7/1962 | Browning | 252—8.5 |
| 3,099,624 | 7/1963 | Wilson | 252—8.5 |

FOREIGN PATENTS 803,544   10/1958   Great Britain.

OTHER REFERENCES

That New Drilling Fluid for Hot Holes, article in the Oil and Gas Journal, September 10, 1956, pages 104–107.

Pressure Differential Sticking of Drill Pipe, article in the Oil and Gas Journal, June 17, 1957, pages 132–136.

CHARLES E. O'CONNELL, *Primary Examiner.*

JULIUS GREENWALD, *Examiner.*

---

UNITED STATES PATENT OFFICE
CERTIFICATE OF CORRECTION

Patent No. 3,223,622                                December 14, 1965

James L. Lummus et al.

It is hereby certified that error appears in the above numbered patent requiring correction and that the said Letters Patent should read as corrected below.

Columns 5 and 6, Table III, first column, line 2 thereof, for "10 1/3" read -- 10% --; column 6, line 18, for "aded" read -- added --; line 41, for "adidtion" read -- addition --.

Signed and sealed this 29th day of November 1966.

(SEAL)
Attest:

ERNEST W. SWIDER                                    EDWARD J. BRENNER
Attesting Officer                                   Commissioner of Patents

UNITED STATES PATENT OFFICE
CERTIFICATE OF CORRECTION

Patent No. 3,223,622                           December 14, 1965

James L. Lummus et al.

It is hereby certified that error appears in the above numbered patent requiring correction and that the said Letters Patent should read as corrected below.

Columns 5 and 6, Table III, first column, line 2 thereof, for "10 1/3" read -- 10% --; column 6, line 18, for "aded" read -- added --; line 41, for "adidtion" read -- addition --.

Signed and sealed this 29th day of November 1966.

(SEAL)
Attest:

ERNEST W. SWIDER                        EDWARD J. BRENNER
Attesting Officer                          Commissioner of Patents